Nov. 17, 1936.  E. SCHWARZ  2,061,134
PROCESS FOR MAKING SPINDLES FOR LAMP STANDARDS
AND THE LIKE AND PRODUCTS THEREOF
Filed Aug. 10, 1935  4 Sheets-Sheet 1
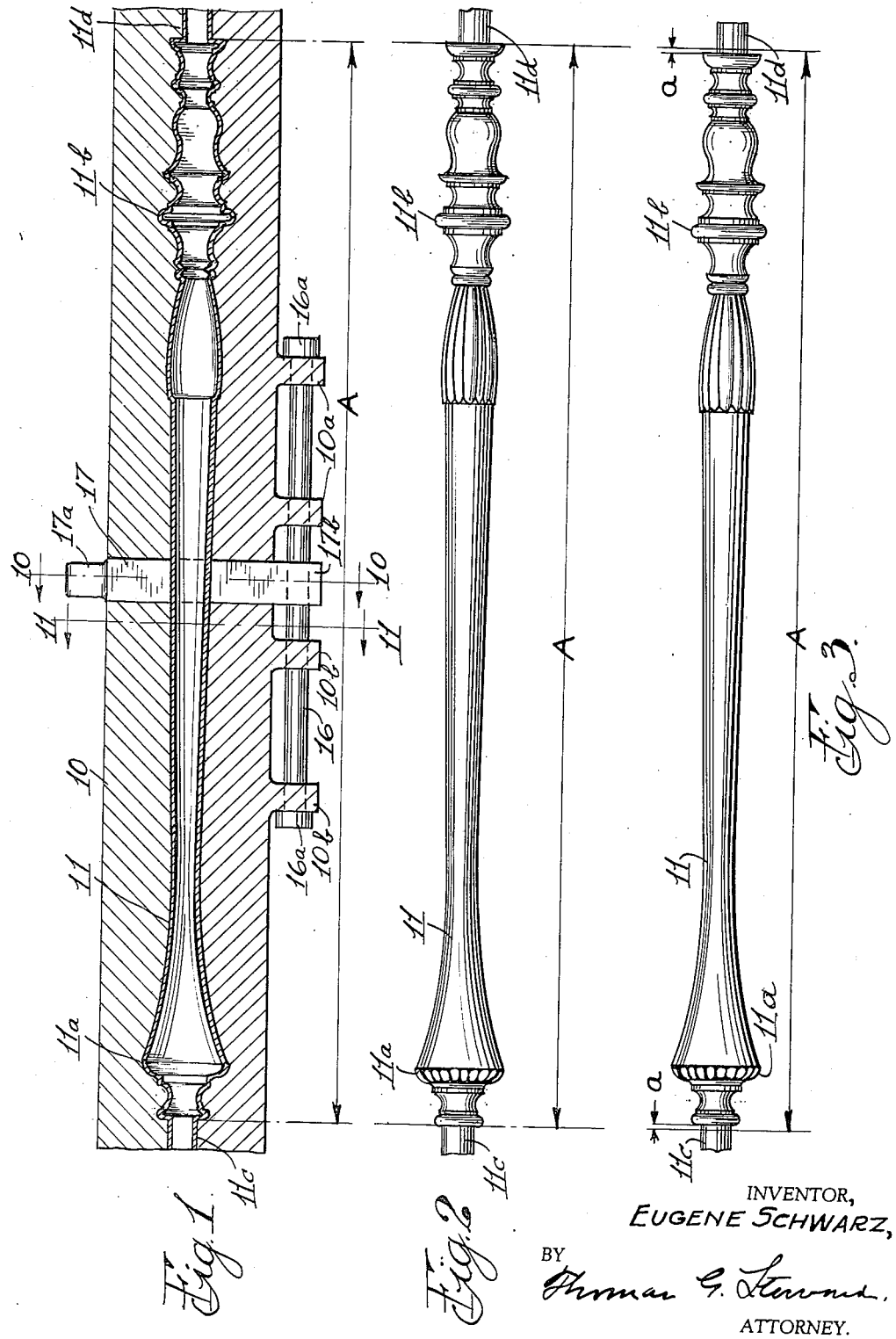
INVENTOR,
EUGENE SCHWARZ,
BY
Thomas G. Steward
ATTORNEY.

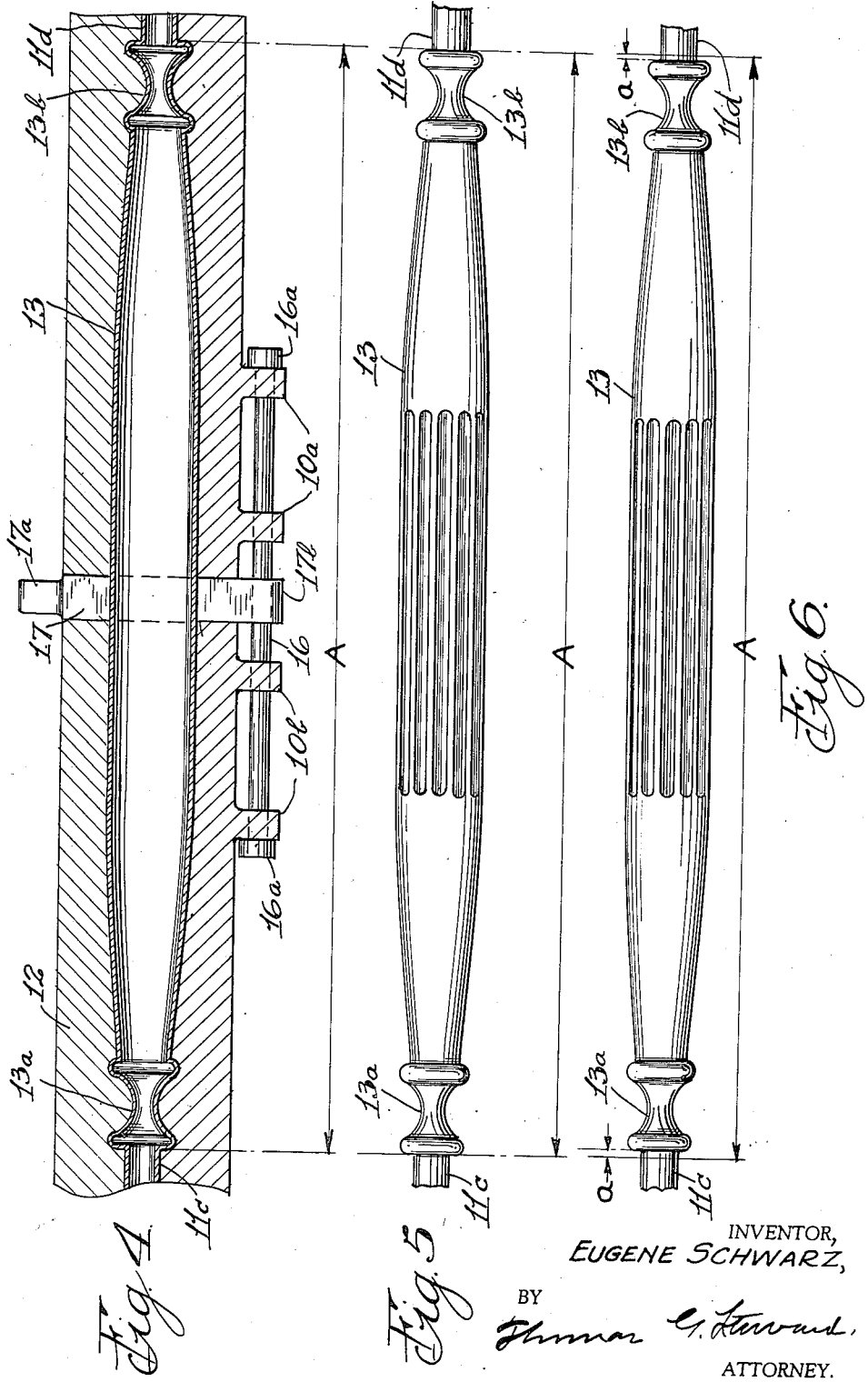

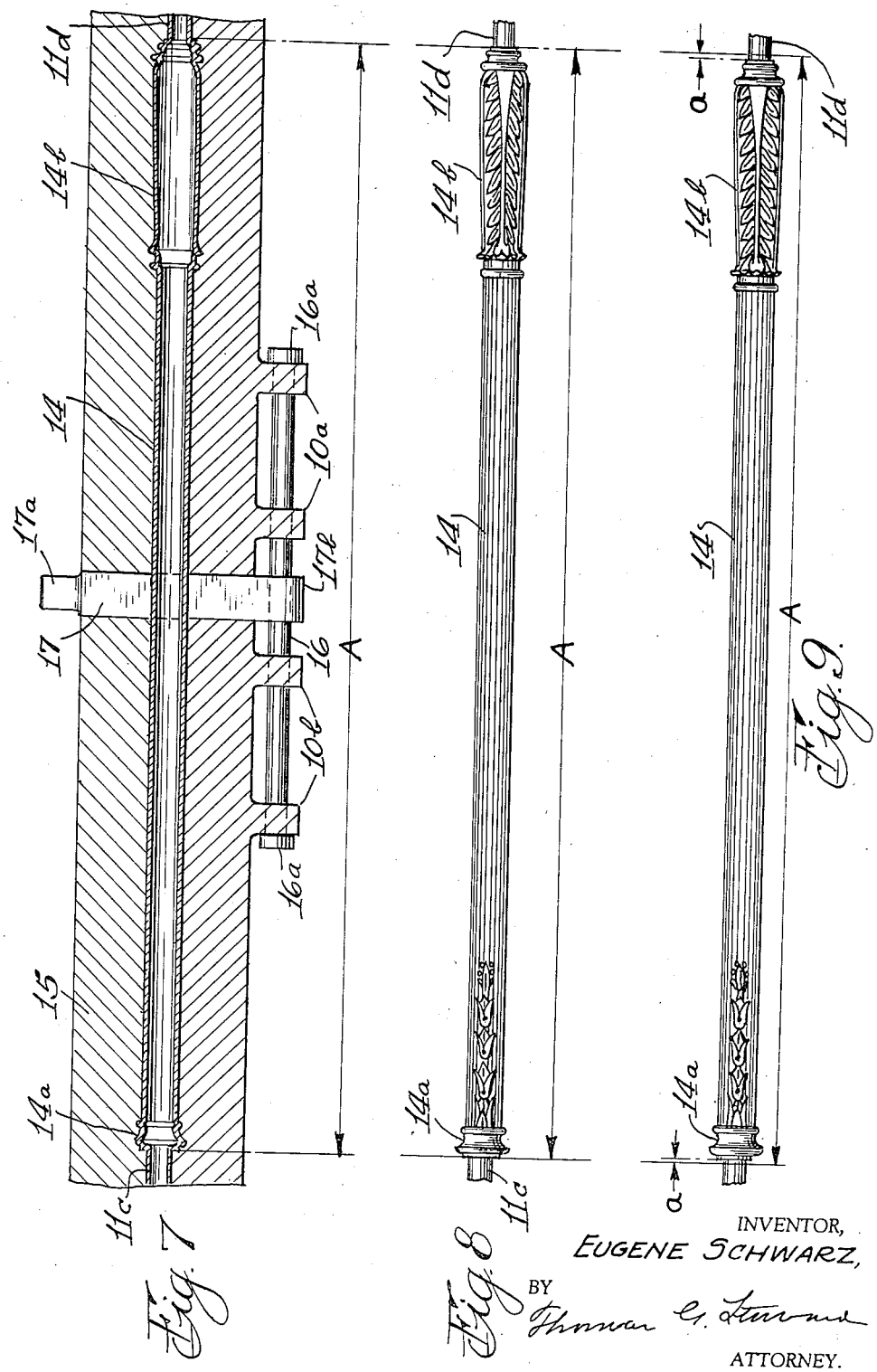

Nov. 17, 1936.                    E. SCHWARZ                    2,061,134
           PROCESS FOR MAKING SPINDLES FOR LAMP STANDARDS
                    AND THE LIKE AND PRODUCTS THEREOF
                    Filed Aug. 10, 1935          4 Sheets-Sheet 4

INVENTOR,
EUGENE SCHWARZ,
BY
Thomas G. Steward,
ATTORNEY.

Patented Nov. 17, 1936

2,061,134

UNITED STATES PATENT OFFICE 2,061,134

PROCESS FOR MAKING SPINDLES FOR LAMP STANDARDS AND THE LIKE, AND PRODUCTS THEREOF

Eugene Schwarz, Alexandria, Ind., assignor to The Mantle Lamp Company of America, Chicago, Ill., a corporation of Illinois Application August 10, 1935, Serial No. 35,605

9 Claims. (Cl. 22—200)

My invention is an improved process for producing long tubular spindles adapted for use for floor lamps and similar purposes, which spindles, in accordance with my present invention, are made in tubular form by the slush method of casting, and are preferably made of white metal having a high coefficient of contraction. Besides the improved method of producing such spindles, my present invention also includes the product resulting from said process.

Heretofore, with exceptions to which I hereinafter refer, it has been considered impossible for those skilled in the art to produce long tubular spindles of cast white metal by the slush method of casting. Spindles of the kind referred to must frequently be from 30″ to 40″ long or longer, and heretofore it has been common practice to make said spindles in sections, each constituting a part of the length of the complete spindle, and then to secure the sections of each spindle together, for example, by a tie rod or pipe extending through the spindle. By my present invention, I am able to produce such spindles as unitary structures, even where the length of the spindles is longer than 40″. I make use of the terms "slender" and "long" in classifying spindles of the kind under consideration in the present specification and claims, to designate unitary slush-cast spindles that have a portion or portions between mould-interlocking parts, of such length that they would rupture if permitted to cool and contract without being relieved from the longitudinal restraint exerted by the mold on the casting through said interlocking parts. I am aware that processes for producing long spindles have heretofore been proposed and are disclosed in applications for United States Letters Patent filed by another applicant and bearing Serial Nos. 757,424 and 757,499, both filed December 14, 1934, which processes constitute the exceptions referred to, in connection with the practicability of producing long spindles by the slush method of casting.

The difficulties encountered in attempting to construct long spindles of white metal by the slush method of casting, result largely, if not wholly, from the fact that the white metal which it is desirable to use in making the castings, besides having a low melting temperature, has a high coefficient of contraction relatively to the bronze or other metal of which the molds are made, it being understood that the molds employed in making slush castings are rigid molds, preferably of metal, to secure the advantages of the slush method of casting, bronze being well adapted for this purpose. In many cases the coefficient of contraction of the white metal may be as much as 50% greater than the coefficient of contraction of the molds, or even more where a metal is employed in making the molds which has a lower coefficient of contraction than bronze.

Again, the chilled and set cast metal is much hotter than the mold, and this temperature difference greatly increases the difference between the amount of casting contraction and the amount of mold contraction, over what it would be if both the casting and the mold were cooled from the same temperature.

With the exceptions referred to, attempts heretofore made to cast long tubular spindles of white metal, by the slush method of casting, have failed because a long portion or portions of the spindle have been relatively free to move longitudinally in the mold during the cooling of the casting, without the possibility of corresponding movement in the mold of the mold-restrained parts of the casting, due to ornamental or other projections, with the result that the castings have invariably ruptured.

By the process disclosed in application, Serial No. 757,424, above referred to, the difficulty mentioned is cured by interlocking the casting with the mold at spaced locations longitudinally of the casting and so spacing these interlocking portions that the strains of contraction are distributed throughout the cooling casting, and maintained throughout the entire spindle below the limit of rupture of the casting, although the casting is necessarily stretched during its cooling and is of substantially the length of the mold after it has been cooled and taken from the mold.

By the process disclosed in application, Serial No. 757,499, above referred to, the spindle is constructed so that although its central portion and one end portion may be provided with ornamentation, said ornamentation is of such a nature as to not interlock with the mold in a manner to prevent longitudinal movement of the cooling casting in the mold, so that although one end portion of the casting may be so interlocked with the mold, due to ornamentation thereon or otherwise, the central portion and the other end portion of the casting are free to move longitudinally in the mold when the casting is cooling, without producing appreciable strains of contraction in the casting.

The process of my present application differs materially from the process of either of said prior applications, in that the unitary casting is provided with parts that interlock with the mold in a manner to prevent longitudinal movement of said parts in the mold, at the same time leaving the remaining portions of the casting between said mold-interlocking parts, substantially free for longitudinal movement in the mold during the cooling of the casting, one or more of said remaining portions being of so great a length that rupturing of the spindle occurs, unless the steps of treatment of my improved process of the present application, are employed.

In carrying out my present process, the mold is filled with the molten white metal, then, when the metal has chilled against the surface of the mold to produce the desired thickness of tubular wall of the casting, which takes place almost immediately, the remaining molten metal is at once removed from the chilled casting and from the mold, leaving the casting in the mold, at which time, although the molten metal has cooled sufficiently to chill and set it against the surface of the mold, no appreciable strains of contraction due to cooling, have as yet been produced in the casting. To prevent the destructive effects of the strains of contraction, immediately after the surplus molten metal is removed from the mold, as a part of my improved process, a part of the mold is immediately opened and the casting, which is still very hot, is released from the longitudinal restraint of the mold, and is permitted to cool substantially free from said restraint. The chilled and set condition of the casting, maintains it in the form given it by the mold, and by far the greater portion of the cooling of the casting is effected free from longitudinal restraint by the mold, so that substantially no strains of contraction are produced in the casting. When the casting has been completely cooled, it is found by comparison with the mold, that it has contracted substantially longitudinally, which contraction, if it occurred in the mold with the casting held by the mold against said contraction, would be sufficient with spindles of the class under consideration, to rupture the spindle.

With some specific applications of my present process, the spindles have an overall length of from 40″ to 45″ and the portions of the spindles which are substantially unrestrained against longitudinal contraction during cooling, may have lengths as great as from 30″ to 35″, and the outside diameter of the said unrestrained portions of the spindles may range from ¾″ to 1½″, the wall thickness of the tubular structure being usually approximately ⅛″. When said spindles are produced by my present process, I find that the longitudinal overall contraction of the spindles when they have cooled, is substantially ¼″, also that when said spindles are permitted to cool in the molds for the purpose of demonstrating the efficiency of my present process, without relieving the castings from the longitudinal restraint of the molds, the ruptured ends of the spindles in the molds, are separated from ⅛″ to 3/16″. The longitudinal contraction attending the use of my present process, and the amount of separation of the ruptured ends in attempting to make the same spindles by the usual process of cooling the spindles in the molds, afford general indications of the strains of contraction produced in the spindles in trying to cast spindles of the kind under consideration and cool them in their molds, as heretofore attempted in the art.

As far as I am aware, I am the first to successfully avoid the rupturing of long spindles of cast white metal having mold-interlocking parts and long portions between said parts that are substantially free from longitudinal restraint by the mold, which spindles have ruptured when their casting has been attempted in the manner heretofore used in the art, and to appreciate that the particular treatment of the cast spindles during their cooling, as above described and which constitutes a part of my present process, can be made to successfully produce such long spindles by the slush method of casting, which spindles when cooled are substantially free from internal strains of contraction, and are quite the equal in every respect of short tubular spindles heretofore successfully produced by the slush method of casting.

In the accompanying drawings, I illustrate several forms of long spindles which may be successfully cast of white metal by the slush method of casting, it being understood that many different forms and designs of spindles may be so produced, said drawings being as follows:

Fig. 1 illustrates a mold in a longitudinal, sectional view taken centrally through the mold cavity, with a cast spindle therein after it has been chilled and set, and the surplus molten metal has been poured from the mold;

Fig. 2 shows in side elevation, the spindle illustrated in Fig. 1 without the mold, immediately after it is chilled enough to set;

Fig. 3 shows in a view similar to Fig. 2 the same spindle after it has cooled;

Figure 10:
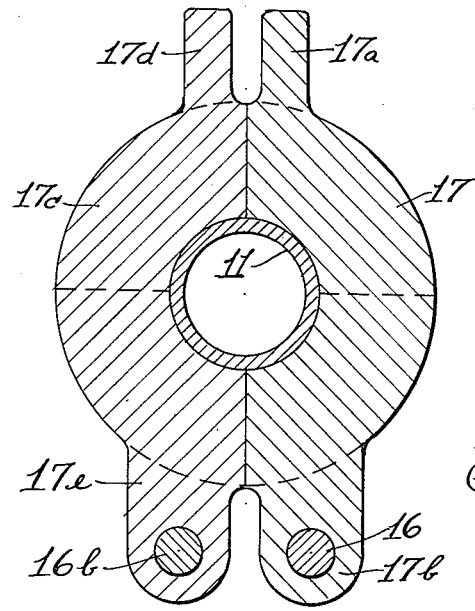
Figure 11:
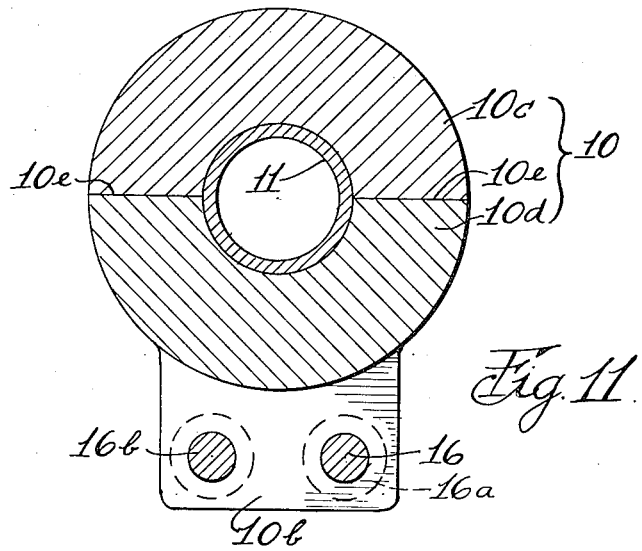

Figs. 4, 5 and 6 show in views similar to Figs. 1, 2 and 3, respectively, a somewhat different type of spindle in which the mold-interlocked end portions of the spindle are of smaller diameter than the central portion of the spindle, whereas with the spindle illustrated in Figs. 1, 2 and 3, the end portions of the spindle are of larger diameter than its central portion;

Figs. 7, 8 and 9 show in views similar, respectively, to Figs. 1, 2 and 3, a still different form of spindle in which the central portion of the spindle is of substantially uniform diameter, whereas with the spindles shown in Figs. 1 to 3, inclusive, and 4 to 6, inclusive, there is some variation in the diameter of the spindle throughout its central portion, which however is so gradual as to not interfere with substantial longitudinal movement of the central portion of the spindle in the mold, if it were left in the mold during the cooling of the spindle; and Figs. 10 and 11 are vertical, sectional views, on an enlarged scale, of the structure shown in Fig. 1, taken respectively along the lines 10—10 and 11—11.

Similar numerals refer to similar parts throughout the several views.

As shown in Fig. 1, I illustrate a mold 10 having a mold cavity to produce a spindle 11 of cast white metal by the slush method of casting, the spindle being shown in the mold after the mold has first been filled with molten white metal and then the surplus molten metal has been removed from the chilled casting and from the mold, leaving the spindle for the moment in the mold. It will be understood that the mold is sectional longitudinally, so that it may be opened and the casting removed, as is well known in the art.

The spindle 11 is provided at its end portions with ornamental parts 11a and 11b which are of larger external diameter than the external diameter of the central portion of the spindle, as a result of which said enlarged end parts 11a and 11b interlock with the mold and prevent longitudinal movement of the end parts of the cast spindle in the mold. As indicated, the central portion of the spindle varies in external diameter somewhat at different parts, the variation being in the form of a gradual curve. As a result, if the casting were cooled in the mold, and if it were at the same time subject to longitudinal restraint by the mold, as has been the common practice heretofore, the strains of contraction produced in the central portion would be exerted upon the weakest part of the central portion and the spindle would be ruptured at that part. By my improved process, however, immediately after the surplus molten metal has been removed from the spindle and from the mold, the spindle 11 is released from longitudinal restraint by the mold, at which time it has the size and appearance indicated in Fig. 2. The length A indicated in Fig. 1 is the overall length of the mold cavity for the spindle, and also the overall length of the spindle 11 in the mold at the instant it is first chilled against the mold, and in Fig. 2 the spindle has the same overall length A, since Fig. 2 represents the spindle before it has had opportunity to cool and contract appreciably.

In Fig. 3 I illustrate the spindle 11 in a view similar to Fig. 2, the difference being that I have shown in Fig. 3 the spindle as cooled and contracted to substantially its final condition, this cooling and contraction being effected with the central portion of the spindle free to contract without the production of appreciable internal strains of contraction in the spindle. For this condition, however, it is found that the former overall length A of the spindle 11 is no longer its overall length, each end of the spindle being within or shorter than the overall length A, by an amount $a$, due to the contraction of the spindle during its cooling. As above stated, in some cases the length A is from 40″ to 45″, and the total contraction in length of the spindle during cooling, represented by both of the end contractions $a$, amounts to substantially ¼″. It will be understood that the end portions 11c and 11d are not parts of the spindle proper as they are incident to the casting of the spindle in the mold and are removed in finishing the ends of the spindle.

While the spindle 11 may be freed from the longitudinal restraint of the mold during the cooling of the spindle, in any desired manner, the structure provided in Figure 1 to accomplish this result is as follows:

As more clearly shown in Figure 10, the midportion of the mold 10, consists of short similar portions 17 and 17c, respectively, having downwardly extending lugs 17b and 17e mounted for free turning movement on rods 16 and 16b, respectively, which rods are carried with sliding fits by brackets 10a and 10b extending from the mold 10 as shown for the rod 16 in Fig. 1, said rods being substantially parallel with each other and with the mold 10. The rods 16 and 16b are provided with end heads as illustrated in Fig. 1 for the rod 16 at 16a, which heads, by engaging the corresponding brackets 10a and 10b when the main portions of the mold are moved as far from each other as they will go, limit the separation of the adjacent ends of said main portions to such an amount that the short mold portions 17 and 17c may be inserted between said ends with a snug sliding fit, until they meet in a substantially vertical plane to continue the casting surface of the mold without interruption from one of said main mold portions to the other. The main portions of the mold 10 and also its short portions 17 and 17c are preferably made of bronze or other suitable metal, thus forming a casting surface of metal which is continuous throughout and has the conformation of the spindle to be cast, when the molten casting metal is poured into the mold.

The short portions 17 and 17c are provided with upwardly extending lugs 17a and 17d respectively, to facilitate clamping the portions 17 and 17c together in readiness to pour the molten metal into the mold.

Each of the main portions of the mold 10, illustrated in Fig. 1, as more clearly shown for the left-hand one of said main portions in Fig. 11, consists of upper and lower sections 10c and 10d respectively, meeting in a substantially horizontal plane to facilitate removing the casting from the mold, these sections being held together by suitable clamps during casting, in any desired manner known to the art. As shown in Fig. 11 the mold sections 10c and 10d, when clamped together, meet at the surfaces 10e, 10e, the section 10d having rigidly attached to it, the brackets 10b supporting the rods 16 and 16b.

In casting the spindle 11, the parts of the mold 10 are clamped together in the relation shown in Fig. 1, 10 and 11, the molten metal is introduced into the mold and the surplus molten metal is removed from the mold, and the wall of the spindle 11 immediately chills and sets initially with white metal of low melting temperature; then the short portions 17 and 17c of the mold are at once released and opened, the lugs 17a and 17d being useful in so doing where a hammer is used in opening said portions. This frees the casting from longitudinal restraint by the mold, and the major part of the cooling of the casting is effected free from such restraint, which insures against rupturing the casting by its contraction due to cooling. The casting may be taken from the mold at once after opening the portions 17 and 17c, as it then has stability of form due to its quick chilling and setting, thus making the mold available for further use without delay.

It will be understood that other mold constructions may be employed as desired, in carrying out my process, the essential part of which is freeing the casting from longitudinal mold restraint before appreciable cooling and contraction of the casting takes place; also that the casting may be removed from its mold as soon as said casting is chilled and set sufficiently to give it stability of form, even though it is then but partly cooled.

The principle governing the successful operation of my process in the manufacture of long, slender, tubular spindles, is that the casting must be freed from the longitudinal restraint of the mold due to the longitudinal shrinkage of the casting, before sufficient shrinkage of the casting has taken place to rupture it.

In Fig. 4, I illustrate a mold 12 for casting a spindle 13 of white metal by the slush method of casting, the difference from the spindle 11 being that the end portions 13a and 13b of the spindle that interlock with the mold, are of smaller diameter than the central portion of the spindle, although they quite as effectively prevent longitudinal movement of the end portions of the spindle in the mold, as the interlocking end portions 11a and 11b described in connection with Fig. 1. In other respects, the mold, its operation and the results are similar to those above described for the spindle 11 and the overall length A and the amounts of contraction $a$, $a$, have the same general significance.

In Figs. 7, 8 and 9, I illustrate a still different design of spindle 14, which in Fig. 7 is shown in a mold 15 for casting the spindle of white metal by the slush method of casting, said spindle being provided with ornamental end portions 14a and 14b which interlock with the mold to prevent longitudinal movement of said end portions in the mold, the central portion of the spindle being of substantially uniform cross section and free to move longitudinally in the mold, excepting for the effect of the interlocking end portions of the spindle. In other respects, the mold, its operation and the results are similar to those above described for the spindle 11, and the overall length A and the amounts of contraction $a$, $a$, have the same general significance.

For the reasons stated, my process is particularly effective in successfully producing long slender spindles of cast white metal by the slush method of casting, where the spindles have mold interlocking parts connected by long portions which are substantially free for longitudinal contraction and movement in the mold, and I consider my present invention to include the process described and also the product resulting from said process.

Among the advantages resulting from my process may be mentioned the simplicity, cheapness and effectiveness of producing long slender spindles of the kind described, since the spindles resulting from my process are unitary structures and require no internal reinforcing or connecting tie rods or tubes, which have heretofore been necessary when such spindles have been made, on account of said earlier spindles having necessarily been made in several sections longitudinally, excepting where the processes of said prior applications have been employed.

While I have shown my invention in the particular embodiment above described, I do not limit myself to the specific forms of spindles shown, or specifically to the treatment described, as I may employ equivalents known to the art at the time of the filing of the present application, without departing from the scope of the appended claims.

Having thus described my invention, what I claim is:

1. The process of casting unruptured long and hollow spindles of white metal having mold-interlocking portions in molds having casting surfaces of metal which are continuous throughout, which consists of introducing molten white metal into the mold, allowing the portions of said molten metal which are in contact with the mold to solidify and form a tubular spindle of desired thickness, removing the still molten metal from the interior of said spindle, and, finally, releasing the hollow spindle from the longitudinal restraint of the mold before the spindle has appreciably cooled.

2. The process of casting long unitary and tubular metal spindles in molds having casting surfaces of metal which are continuous throughout, adapted for use as lamp standards and other purposes requiring long, slender, tubular structures, having portions which interlock with a mold and a connecting portion which is susceptible of rupture in the mold, consisting of introducing molten metal having a large coefficient of contraction into a mold, chilling and setting the molten metal in tubular form against the wall of the mold, removing from the mold the still molten metal in the casting, and releasing the tubular cast-metal structure from longitudinal restraint before appreciable longitudinal contraction of said structure occurs.

3. The process of making slush castings in molds having casting surfaces of metal which are continuous throughout, comprising long unitary and tubular cast-metal spindles adapted for use as lamp standards and other purposes requiring long, slender, tubular structures having portions which interlock with a mold and a connecting portion which is susceptible of rupture in the mold, consisting of introducing molten metal having a large coefficient of contraction into a metal mold, chilling and setting the molten metal in tubular form against the wall of the mold initially restraining the casting therein against longitudinal contraction, removing from the casting and mold the still molten metal therein, and relieving the tubular cast-metal structure from longitudinal restraint before appreciable longitudinal contraction occurs.

4. The process of making an unruptured long and hollow spindle of white metal having mold-interlocking portions in molds having casting surfaces of metal which are continuous throughout, which consists of introducing molten white metal into the mold, allowing the portions of said molten metal which are in contact with the mold to solidify and form a tubular spindle of desired thickness, removing the still molten metal from the interior of said spindle, and, finally, removing the hollow spindle from the mold while it is still hot and substantially free from detrimental longitudinal contractile stresses.

5. The process of making an unruptured long and hollow spindle of white metal having mold-interlocking portions and a connecting portion which is susceptible of rupture in the mold, which consists of introducing molten white metal into a mold, allowing the portions of said molten metal which are in contact with the mold to solidify and form a tubular spindle of desired thickness, removing the still molten metal from the interior of said spindle, and, finally, removing the hollow spindle from the mold while it is still hot and substantially free from detrimental longitudinal contractile stresses.

6. An unruptured long and tubular slush casting of metal having a large coefficient of contraction and having spaced external mold-locking contours, and of a length between said contours susceptible to rupture by cooling when restrained and substantially unstretched longitudinally.

7. An unruptured long slush-cast tubular and unitary structure having spaced mould-interlocking contours and free from mold-interlocking portions between said interlocking contours, and having a cooling contraction between said contours greater than the elongation within the limit of rupture of the cast tubular structure between said contours.

8. A unitary slush cast tubular spindle having spaced mold-interlocking portions and a connecting non-interlocking mid-portion, and made of metal having a coefficient of contraction substantially greater than that of the metal mold in which it is cast, said mid-portion having a wall too thin to withstand without rupture the strains of cooling when restrained against contraction.

9. A long slender tubular and unitary cast metal structure suitable for lamp spindles and the like, consisting of a slush casting of white metal having a large coefficient of contraction, said casting having spaced mold-interlocking portions, and having a connecting portion free from such interlocks, said structure between said mold-interlocking portions, when cooled, being substantially shorter than the cavity in the mold producing it.

EUGENE SCHWARZ.